(12) United States Patent
Brehm et al.

(10) Patent No.: US 9,463,659 B2
(45) Date of Patent: Oct. 11, 2016

(54) METHOD FOR PRODUCING A FILM ELEMENT

(71) Applicants: Ludwig Brehm, Adelsdorf (DE); Haymo Katschorek, Obermichelbach (DE); Norbert Laus, Furth-Burgfarrnbach (DE)

(72) Inventors: Ludwig Brehm, Adelsdorf (DE); Haymo Katschorek, Obermichelbach (DE); Norbert Laus, Furth-Burgfarrnbach (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 248 days.

(21) Appl. No.: 14/224,737

(22) Filed: Mar. 25, 2014

(65) Prior Publication Data

US 2014/0205852 A1  Jul. 24, 2014

Related U.S. Application Data

(63) Continuation of application No. 12/918,849, filed as application No. PCT/EP2009/001452 on Feb. 28, 2009, now Pat. No. 8,720,951.

(30) Foreign Application Priority Data

Mar. 6, 2008  (DE) .................. 10 2008 013 073

(51) Int. Cl.
*B42D 25/445* (2014.01)
*B42D 25/337* (2014.01)
(Continued)

(52) U.S. Cl.
CPC ............. *B42D 25/373* (2014.10); *B42D 25/29* (2014.10); *B42D 25/328* (2014.10);
(Continued)

(58) Field of Classification Search
CPC  B42D 25/445; B42D 25/337; B42D 25/373; B42D 2035/14; B42D 2033/10
USPC .......................................................... 430/5
See application file for complete search history.

(56) References Cited

U.S. PATENT DOCUMENTS 6,037,105 A    3/2000  You et al.
6,491,324 B1 * 12/2002 Schmitz .............. B42D 25/355
                                             283/72

(Continued)

FOREIGN PATENT DOCUMENTS

CH  WO 2007007784 A1 *  1/2007  .......... B42D 25/355
DE     102005049891    *  4/2007  ............. B42D 25/42

(Continued)

OTHER PUBLICATIONS

EP1747905 Translation.*

*Primary Examiner* — Kyle Grabowski
(74) *Attorney, Agent, or Firm* — Hoffmann & Baron, LLP

(57) ABSTRACT

The invention concerns a process for producing a film element having mutually registered metallic layers (11, 16) and a film element which can be produced by such a process. A first metallic layer (11) provided on a first surface of a flexible single-layer or multi-layer carrier film (10) and a masking layer (13) provided on the second surface of the carrier film (10), opposite to the first surface, are structured in accurate register relationship with each other by means of mutually synchronized structuring procedures. After structuring of the first metallic layer (11) and the masking layer (13) one or more further layers are applied to the first metallic layer (11). Applied to the one or more further layers (15) is a second metallic layer (16) to which a first photoactivatable layer (17) is applied. The first photoactivatable layer (17) is structured by means of trans-exposure through the masking layer (13), the first metallic layer, the one or more further layers and the second metallic layer (16) from the side of the masking layer (13) by means of electromagnetic radiation of a wavelength to which the first photoactivatable layer (17) is sensitive, or the first photoactivatable layer is exposed controlledly through the masking layer from the side of the film body that is opposite to the masking layer.

8 Claims, 7 Drawing Sheets

(51) Int. Cl.
  *B42D 25/373* (2014.01)
  *B42D 25/41* (2014.01)
  *B42D 25/42* (2014.01)
  *B42D 25/29* (2014.01)
  *B42D 25/45* (2014.01)
  *B42D 25/351* (2014.01)
  *B42D 25/328* (2014.01)
  *B42D 25/346* (2014.01)

(52) U.S. Cl.
  CPC ......... *B42D 25/337* (2014.10); *B42D 25/346* (2014.10); *B42D 25/351* (2014.10); *B42D 25/41* (2014.10); *B42D 25/42* (2014.10); *B42D 25/445* (2014.10); *B42D 25/45* (2014.10); *B42D 2033/10* (2013.01); *B42D 2035/14* (2013.01); *Y10T 428/12361* (2015.01); *Y10T 428/12535* (2015.01); *Y10T 428/24752* (2015.01)

(56) References Cited

U.S. PATENT DOCUMENTS

| | | | |
|---|---|---|---|
| 6,699,313 | B2 | 3/2004 | Coulter et al. |
| 7,535,641 | B2* | 5/2009 | Wild .................... B42D 25/328 283/85 |
| 8,053,146 | B2* | 11/2011 | Staub .................... B44C 1/14 430/5 |
| 8,367,277 | B2* | 2/2013 | Brehm .................... B42D 25/328 430/5 |
| 2005/0104364 | A1* | 5/2005 | Keller .................... B42D 25/29 283/72 |
| 2005/0141094 | A1 | 6/2005 | Wild et al. |
| 2007/0296204 | A1 | 12/2007 | Phillips et al. |
| 2008/0050660 | A1 | 2/2008 | Staub et al. |
| 2008/0310025 | A1 | 12/2008 | Staub et al. |
| 2009/0136721 | A1* | 5/2009 | Staub .................... G03H 1/02 430/311 |
| 2009/0317595 | A1 | 12/2009 | Brehm et al. |
| 2012/0025514 | A1* | 2/2012 | Camus .................... G07D 7/006 283/67 |

FOREIGN PATENT DOCUMENTS

| | | | |
|---|---|---|---|
| EP | 1747905 | | 1/2007 |
| EP | 1747905 A2 * | 1/2007 | .......... B42D 25/355 |
| EP | 2028017 | | 2/2009 |
| JP | H05-021317 | | 1/1993 |
| JP | 0967091 A1 * | 12/1999 | .......... B42D 25/342 |
| JP | 2002-036800 | | 2/2002 |
| JP | 2002190117 | | 7/2002 |
| JP | 2002314208 | | 10/2002 |
| JP | 2006504545 | | 2/2006 |
| JP | 2008-0530600 | | 8/2008 |
| JP | 2010-500186 | | 1/2010 |
| WO | WO03095227 | | 11/2003 |
| WO | WO2004020218 | | 3/2004 |
| WO | WO2006084686 | | 8/2006 |

* cited by examiner

METHOD FOR PRODUCING A FILM ELEMENT

This application is a continuation application of U.S. application Ser. No. 12/918,849, filed Sep. 2, 2010, which claims priority based on an International Application filed under the Patent Cooperation Treaty, PCT/EP2009/001452, filed on Feb. 28, 2009 and German Application No. DE 102008013073.7-45, filed on Mar. 6, 2008.

BACKGROUND OF THE INVENTION

The invention concerns a process for producing a film element having mutually registered metallic layers and such a film element.

Film elements with metallic reflection layers are frequently used to make it difficult and if possible prevent copying and misuse of documents such as banknotes, credit cards or charge cards or products, as an optically variable security element (OVD). To further increase the forgery-resistant nature of such film elements the use of optically variable security elements has been proposed, whose metallic reflection layer is not provided over the full area in the film element but is structured and is only partially provided in the film element. In that respect the expression mutually registered metallic layers is used to denote layers which are arranged in accurate register relationship with each other, that is to say which are structured in a fixed relationship with each other.

Thus for example WO 03/095227 A1 describes an optically variable security element whose metallic reflection layer is only partially provided and thus a transparent window is provided in the security element. In that respect, for structuring of the metallic reflection layer, it is proposed that the metallic reflection layer is vapour-deposited over the full surface area and then removed again by means of positive or negative etching or ablation in the regions in which the transparent window is provided.

It has now been found that further interesting optically variable effects can be achieved by a procedure whereby not just one metallic reflection layer is provided within a film element, but two partially shaped metallic reflection layers which appear opaque to the human viewer. In that case, particular significance is attributed to orientation of the two metallic layers in accurate register relationship as they can possibly greatly influence the resulting optical properties. Optically readily detectable orientation in accurate register relationship of the two metallic layers with each other can also be used itself directly as a security feature because reconstruction of that exact orientation in accurate register relationship is difficult and often complicated and expensive. With the previously known processes however, a film element with metallic layers which are oriented in as accurate register relationship with each other as possible and which in particular are differently structured can be implemented only with difficulty: if for example to manufacture such a film element, in a first production step, a first metallic layer is structured by means of a photoresist and, after some intermediate steps (application of further layers), in a second production step a second metallic layer is structured by means of a photoresist, registration of the second exposure process in relation to the structured first metallic layer is only possible with difficulty and involves major registration inaccuracies. In addition it has been found that the film body is admittedly only slightly but unpredictably distorted due to the processing steps which take place between the exposure processes so that for that reason also perfect structuring in accurate register relationship of the second metallic layer with the first metallic layer is unsuccessful with that procedure.

SUMMARY OF THE INVENTION

Now the object of the present invention is to improve the production of film elements with mutually registered metallic layers and to provide a correspondingly improved film element.

That object is attained by a process for producing a film element having mutually registered metallic layers, wherein a first metallic layer provided on a first surface of a flexible single-layer or multi-layer carrier film and a masking layer provided on the second surface of the carrier film, that is opposite to the first surface, are structured in accurate register relationship with each other by means of mutually synchronised structuring processes, preferably optical processes, after structuring of the first metallic layer and the masking layer one or more further layers are applied to the first metallic layer, a second metallic layer is applied to the one or more further layers, a first photoactivatable layer is applied to the second metallic layer, and the first photoactivatable layer is structured by trans-exposure through the masking layer, the first metallic layer, the one or more further layers and the second metallic layer from the side of the masking layer by means of electromagnetic radiation of a wavelength to which the first photoactivatable layer is sensitive, wherein the thickness and the material of the masking layer and the first metallic layer are so selected that the ratio of the degrees of transmission of the masking layer and the first metallic layer at the wavelength of the electromagnetic radiation used for the trans-exposure step is greater than or equal to 1:10, preferably being about 1:10. The first and second metallic layers are thus registered relative to each other and are thus arranged relative to each other in accurate register relationship. According to the invention in that way the first photoactivatable layer serving for structuring of the second metallic layer is not exposed as usual from the side of the photoactivatable layer remote from the metallic layer, but is exposed through that metallic layer. The film body which includes the masking layer, the carrier film, the first metallic layer, the one or more further layers and the second metallic layer is thus exposed from the side of the masking layer, that is to say the exposure device is arranged on the side of that film body, whose uppermost layer is the masking layer. Accordingly, in relation to the exposure device, the masking layer is the layer of the film body that comes closest to the exposure device so that exposure is effected through the masking layer. It has surprisingly been found that when the above-indicated conditions are observed, it is possible for the first photoactivatable layer to be structured by means of the masking layer provided on the second surface of the carrier film, although the second metallic layer which is provided over the full surface area (and which appears opaque to the human viewer) and the (differently) structured first metallic layer are disposed between that masking layer and the photoactivatable layer.

The invention permits structuring in accurate register relationship of the first and second metallic layers and it avoids the above-described problems.

In a preferred embodiment of the invention moreover the ratio of the degree of transmission of the masking layer to the degree of transmission of the first metallic layer at the wavelength of the electromagnetic radiation used for the trans-exposure step is greater than or equal to 1:15, and is preferably between 1:15 and 1:20. In that respect the degree of transmission is used to denote the degree of transmissivity of the layer for the electromagnetic radiation (in percent), that is to say the first metallic layer is at least 15 times as transmissive for the electromagnetic radiation as the masking layer. That achieves particularly secure structuring of the first photoactivatable layer. Investigations have surprisingly shown that, for successful exposure of the first photoactivatable layer, substantially only the degree of transmission of the first metallic layer and the degree of transmission of the masking layer is crucial, presupposing an adequate strength of illumination and exposure duration. The degree of transmission of the layer structure consisting of the (structured) masking layer, the carrier film and the (structured) first metallic layer is determined at the most opaque (most light-impervious) location (masking layer, carrier film, first metallic layer) and at the most transmissive (most translucent) location (masking layer and first metallic layer not present) by the degree of transmission of the carrier film. In addition it is necessary to ensure that, at the locations at which the masking layer is not provided but the first metallic layer is provided, the first photoactivatable layer is also activated in the trans-exposure step and the first photoactivatable layer is not activated at the locations at which the masking layer is provided but the first metallic layer is not provided. If now the ratio of the degrees of transmission of the masking layer and the first metallic layer is selected as indicated hereinbefore, then with an adequate exposure strength and time a structuring, which is oriented in accurate register relationship with the masking layer, of the first photoactivatable layer is possible with any shaping and structuring of the first metallic layer.

It has further proven desirable to select the degree of transmission of the masking layer at the wavelength of the electromagnetic radiation used for the trans-exposure step at less than 6%.

The first and second metallic layers can comprise any metals or metal alloys, wherein the layer thickness of the first metallic layer is so selected that the above-specified conditions in respect of the degrees of transmission of the layers are met. Preferably in this case the first metallic layer comprises silver, preferably of a thickness of from 20 to 40 nm. The second metallic layer preferably comprises aluminium, copper or silver, preferably in a layer thickness of 10 to 50 nm. In that respect it is further also possible for the second metallic layer to comprise two or more mutually superposed sub-layers of different metals. That can be used to so adjust the degree of transmission of the second metallic layer that the illumination strength and/or the exposure time to be used in the trans-exposure step is matched to the existing production machines.

In a preferred embodiment of the invention the masking layer comprises a metal or a metal alloy, in particular copper. Metal layers are distinguished by particularly high opacity with a small layer thickness so that the layer thickness of the masking layer and in addition also the total layer thickness of the film element can be reduced. In addition however it is also possible for the masking layer to comprise two or more layers which preferably include a metal layer. Thus it is possible for example for a black-coloured photoresist layer used for structuring the masking layer to remain as part of the masking layer in the film body.

According to the invention the object is further attained by a process for producing a film element having mutually registered metallic layers, wherein a first metallic layer provided on a first surface of a flexible single-layer or multi-layer carrier film and a masking layer provided on the second surface of the carrier film, that is opposite to the first surface, are structured in accurate register relationship with each other by means of mutually synchronised structuring processes, after structuring of the first metallic layer and the masking layer one or more further layers are applied to the first metallic layer, a second metallic layer is applied to the one or more further layers, a first photoactivatable layer is applied to the second metallic layer, and the first photoactivatable layer is exposed controlledly through the masking layer with electromagnetic radiation to which the photoactivatable layer is sensitive, from the side of the film body opposite to the masking layer, the film body including the masking layer, the first metallic layer, the one or more further layers, the second metallic layer and the first photoactivatable layer, and is thus structured. The first and second metallic layers are thus registered relative to each other and accordingly arranged in accurate register relationship with each other. Exposure of the film body including the masking layer, the carrier film, the first metallic layer, the one or more further layers, the second metallic layer and the first photoactivatable layer is accordingly effected not from the side of the masking layer but from the side of the film body in opposite relationship to that side, so that the exposure device is now arranged on the side of the film body, that is opposite to the masking layer. Accordingly the first photoactivatable layer now forms the layer of the film body, that is closest to the exposure device. This procedure also permits structuring of the first and second metallic layers in accurate register relationship.

In a preferred embodiment of the invention here the masking layer is optically sensed by means of one or more optical sensors and exposure of the first photoactivatable layer is controlled in accordance with the values detected by the optical sensors. Thus it is for example possible that a sensor array optically senses the masking layer and actuates a laser which is arranged at the opposite side of the film body and which controlled by the values detected by the sensor arrangement exposes the first activatable layer simultaneously with the sensing step.

In addition it has also proven desirable to expose the masking layer by means of a light source and to deflect the light reflected by the masking layer to expose the first photoactivatable layer and thus to expose the first photoactivatable layer controlledly through the masking layer. The light which is irradiated on to the masking layer and reflected thereby is thus deflected for example by means of a mirror arrangement around the film body and used for exposure of the film body from the side of the film body, opposite to the masking layer. Such an arrangement is distinguished by an inexpensive structure and a high attainable production speed.

Preferably the procedure with the processes according to invention is as follows:

Preferably the second metallic layer is partially removed by an etching process in the regions in which the first photoactivatable layer was activated in the exposure operation or in the regions in which the photoactivatable layer was not activated in the exposure operation, so that the second metallic layer is structured in accordance with the masking layer in accurate register relationship with the first metallic layer. It is thus possible to use as the photoactivatable layer a photoresist which breaks down or dissolves in the exposed region so that the second metallic layer is removed only in the exposed regions by the etching process (positive resist). In addition it is also possible to use as the photoactivatable layer a photoresist which by virtue of irradiation builds up a protective action in relation to the acid or lye used in the etching process (by polymerisation or hardening) so that the second metallic layer is removed only in the unexposed regions by an etching process (negative resist).

In a preferred embodiment, two mutually synchronised exposure procedures are used in the processes according to the invention as synchronised structuring procedures. For that purpose preferably the masking layer and the first metallic layer are applied to the single-layer or multi-layer film body, then a second photoactivatable layer is applied to the first metallic layer and a third photoactivatable layer is applied to the masking layer and then the second photoactivatable layer is exposed in a first exposure procedure through a first exposure mask and the third photoactivatable layer is exposed in a second exposure procedure through a second exposure mask, wherein the first and second exposure masks are oriented in accurate register relationship with each other and thus the first and second exposure procedures are mutually synchronised.

In addition the first metallic layer and the masking layer are removed by means of an etching process in the regions in which the second photoactivatable layer and the third photoactivatable layer respectively have been activated or not activated by the first and second exposure procedures respectively. In that respect the use of a positive or negative resist is possible, as described hereinbefore.

It has been found that such a procedure makes it possible to achieve a very high degree of register accuracy between the structuring of the first metallic layer and the structuring of the masking layer, which for example cannot be achieved by synchronised printing processes. Moreover such a process makes it possible to achieve high production speeds so that manufacture can be particularly inexpensively implemented. Furthermore it has been found with this procedure that, by virtue of the screening action of the first metal layer and the masking layer which are in fact still present over the full surface area prior to the exposure operation, mutual influencing of the two exposure procedures is reliably prevented and it is thus also possible to simultaneously expose the film body from both sides, whereby the register accuracy can be still further increased. Thus it has proven desirable to arrange the first and second exposure masks at mutually opposite sides of the film body including the first and second photoactivatable layers, the metallic layer, the masking layer and the carrier film, and to simultaneously expose the first and second photoactivatable layers.

Preferably the first and second exposure masks are shaped in a plate form and are irradiated with collimated light. In that case the two exposure masks are preferably connected together by a holding frame which ensures that the two exposure masks are fixed relative to each other in register relationship in the exposure operation. Thus for example upon exposure the two exposure masks are pressed against the film body which is between the exposure masks, in that case they are fixed in a fixed orientation relative to each other by the holding frame and then the film body is exposed from both sides, in each case through the respective exposure mask. That makes it possible to achieve particularly exact orientation of the exposure masks relative to each other and thus a particularly high degree of accurate register relationship for the structuring of the first metallic layer and the masking layer.

In addition however it is also possible for the exposure operation, in place of a plate-shaped exposure mask, to use a drum exposure device and thus for example to expose the film body by means of two drum exposure devices which are (mechanically) synchronised with each other.

Preferably glass masks are used as the first and second exposure masks. Further preferably, an electromagnetic radiation of a wavelength of less than 310 µm is adopted for exposure in the first and/or second exposure procedures, as at that wavelength the plastic used for the carrier film (preferably PET) also has only a low degree of transmissivity and thus the carrier film also contributes to decoupling of the first and second exposure procedures.

In addition however it has also proven desirable, in the process according to the invention, as the synchronised structuring procedures, to use an exposure procedure and a laser ablation procedure which are synchronised with each other. Thus for example the masking layer is structured in a laser ablation procedure by means of a laser and the first metallic layer is structured in an exposure procedure by means of exposure through an exposure mask, the laser being synchronised with the position of the exposure mask. It is possible in that way to dispense with an etching procedure, thereby giving cost savings.

The object of the invention is further attained by a film element which can be produced by means of the above-described processes, comprising a flexible single-layer or multi-layer carrier film, a first metallic layer provided on a first surface of the carrier film, a masking layer provided on a second surface of the carrier film, that is opposite to the first layer, a second metallic layer arranged on the side of the first surface and one or more further layers arranged between the first and second metallic layers, in which the masking layer and the first metallic layer are structured in accurate register relationship with each other and the second metallic layer is structured in accordance with the masking layer in accurate register relationship with the first metallic layer. Preferably the first and second metallic layers at least region-wise overlap each other. It is thus possible by means of the invention to expose the first photoactivatable layer in a subsequent process step by means of a masking layer in such a way that the first photoactivatable layer and thus the second metallic layer are structured in accurate register relationship with the first metallic layer although the first metallic layer is arranged at least region-wise in overlapping relationship with the transparent regions of the masking layer and thus in itself prevents structuring of the first photoactivatable layer.

In a preferred embodiment of the invention the first and second metallic layers represent optically effective reflection layers. The film element is preferably a security element for safeguarding value-bearing documents, for example banknotes, credit cards or ID documents. In that case the one or more further layers are preferably formed by replication lacquer layers, spacer layers or decorative layers. In addition it is also possible for the first and second metallic layers to be in the form of electrode layers of an electrical component and thus the one or more further layers represent one or more electrical function layers, and in particular include layers of a semiconductor, an insulator or an electrically conductive material.

Thus in accordance with a preferred embodiment the first metallic layer and the second metallic layer are structured in accordance with a regular, one-dimensional or two-dimensional raster, that is to say the first metallic layer and the second metallic layer each have respective first regions in which the metal is provided and second regions in which the metal is not provided, which are arranged in accordance with the first and second rasters respectively. The first and second rasters can involve for example a line raster or also a surface raster in which for example point-shaped or quadrangular metallic regions are arranged in a two-dimensional regular arrangement. This can also involve geometrically transformed rasters, for example with circular or wave-shaped raster lines. The raster width of the rasters is preferably more than 300 µm, preferably more than 600 µm. The optical superimposition of the first and second metallic layers gives the human viewer an optical overall impression which already changes markedly with the slightest changes in the orientation of the two rasters relative to each other. It is only when the two rasters are oriented in accurate register relationship that the desired optical impression is afforded, for example a pattern consisting of concentric circles.

In that respect it has further proven to be advantageous to select coincident raster widths for the two rasters and to so orient the first and second rasters with each other that first regions of the metallic layer are arranged in the region of the second regions of the second metallic layer and vice-versa. That is achieved for example by adopting identical rasters as the first and second rasters, the rasters being arranged in a phase displacement of about 180° relative to each other, that is to say being arranged in mutually displaced relationship through about ½ raster width.

In a preferred embodiment of the invention the carrier film has a release layer which permits release of a film body, which includes the first and second metallic layers, from the film element. Thus for example the film element can be in the form of a transfer film, wherein the film body including the masking layer and the carrier film, after application of the film element to a target substrate is removed from the film body which includes the first and second metallic layers and which forms the transfer layer. It is also possible for the carrier film to have a release layer which permits release from the film element of a film body including the masking layer. Thus it is possible, after structuring of the first photoactivatable layer, to release the masking layer from the rest of the film body. That improves further processing of the film element.

BRIEF DESCRIPTION OF THE DRAWINGS

The invention is described by way of example hereinafter by means of a number of embodiments with reference to the accompanying drawing.

DETAILED DESCRIPTION OF THE INVENTION

Reference is made to FIGS. 1 to 6 to row describe hereinafter the process for producing the film element shown in FIG. 7.

Figure 1:
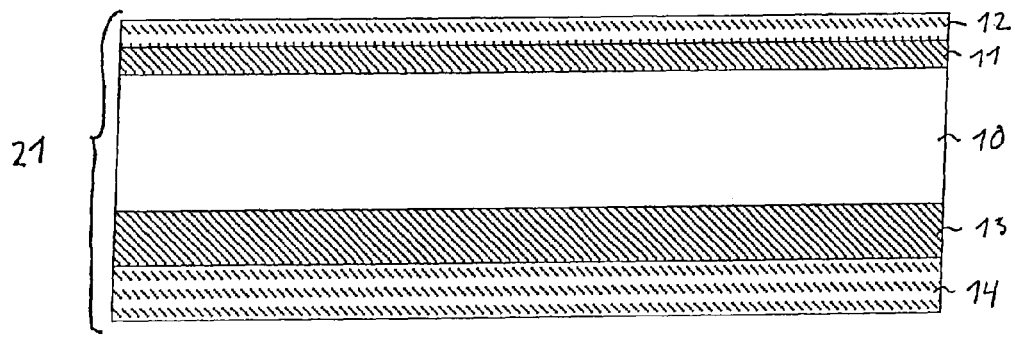
FIG. 1 shows a diagrammatic sectional view of a film body before carrying out the synchronised structuring procedures.

Firstly for that purpose the film body 21 shown in FIG. 1 is produced. The film body 21 has a carrier film 10, a metallic layer 11 applied on a first side of the carrier film, a metallic layer 13 applied on the opposite side of the carrier film 10 and two photoactivatable layers 12 and 14 which in turn are again applied to the metallic layer 11 and the metallic layer 13 respectively. The carrier film 10 is a preferably transparent plastic film of a thickness of between 8 µm and 125 µm. Preferably in this case the carrier film 10 comprises PET or BOPP and is also monoaxially or biaxially stretched. In addition it is also possible that the carrier film 10 comprises not just one layer but also a plurality of layers. Thus it is possible for example that the carrier film 10, besides a plastic carrier, for example a plastic film as described above, has a release layer which permits release from the carrier film 10 of the layer arrangement comprising the layers 11 and 12 or release from the carrier film 10 of the layer arrangement formed by the layers 13 and 14.

In a first production step the metallic layers 11 and 13 are applied to the carrier film 10 over the full surface area for example by means of sputtering or vapour deposition. The metallic layers 11 and 13 comprise for example aluminium, silver, copper, gold or an alloy of those materials. Preferably a different metallic material is used for the metallic layers 11 and 13 and those layers are also applied in different layer thicknesses to the carrier film 10, as is described in detail hereinafter. Thus the metallic layer 13 preferably comprises copper and is of a layer thickness of 100 to 200 nm, further preferably about 200 nm. The metallic layer 11 preferably comprises silver with a layer thickness of between 20 and 40 nm, preferably about 30 nm.

Then in a second production step the photoactivatable layers 12 and 14 are applied to the metallic layer 11 and the metallic layer 13 respectively over the full surface area, for example printing, spraying on or pouring. A negative resist is selected as the photoactivatable material, which is suitable for the exposure wavelength adopted in the following exposure procedure. Thus for example a negative resist designed for UV light is used, which is applied in a layer thickness of 100 to 2000 nm, preferably approximately 800 nm, to the metallic layer 11 and 14 respectively.

It is also possible instead of a negative resist to also use a positive resist, that is to say a photoresist which upon exposure loses its protective action against the acid or lye of the subsequent etching procedure so that the exposed regions are removed in the etching procedure. Thus it is for example possible, as the photoactivatable layer, to apply a negative resist of a thickness of between 100 and 800 nm, preferably a thickness of 200 to 300 nm, which is designed for exposure in the wavelength range of 248 nm (for example exposure with a $CO_2$ laser).

In a subsequent production step the film body 21 is structured by means of two mutually synchronised exposure procedures, as is described hereinafter with reference to FIGS. 2 to 4.

Figure 2:
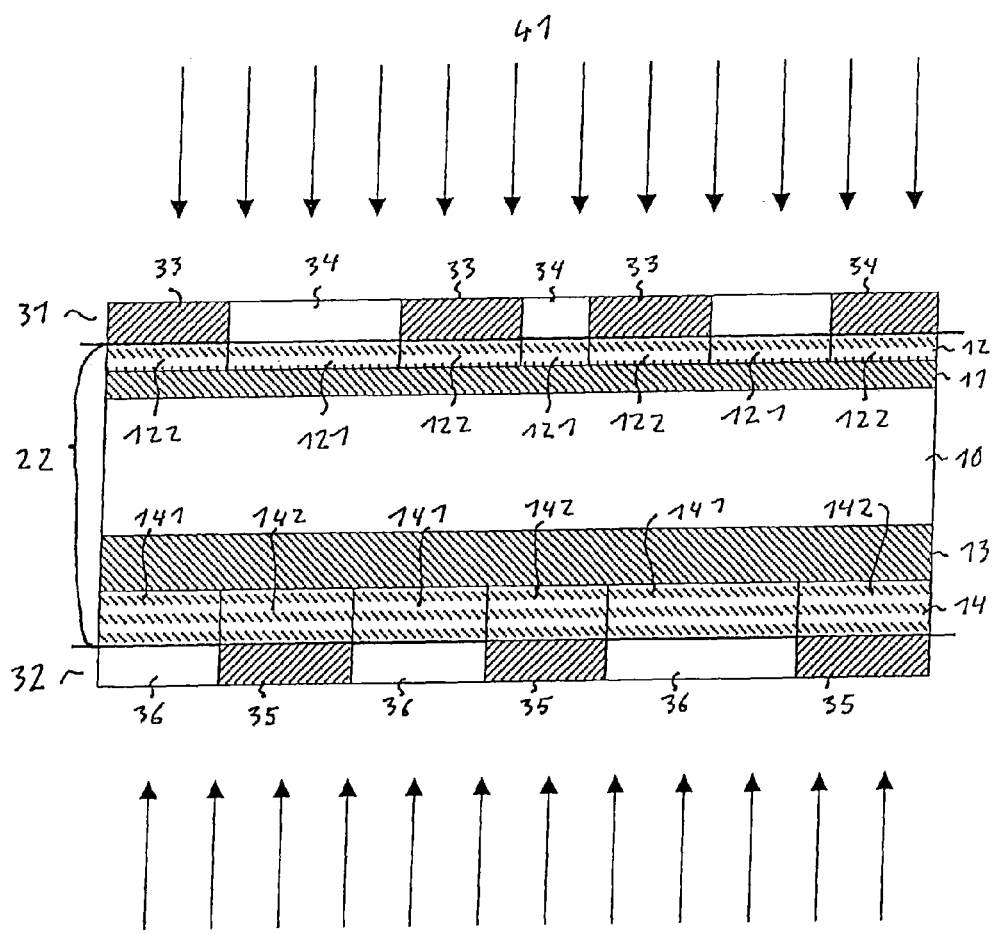
FIG. 2 shows a diagrammatic sectional view of a film body structured by two mutually synchronised exposure procedures.

FIG. 2 shows a film body 22 which is arranged between two masks 31 and 32 and which corresponds to the film body 21 after exposure. The film body 22 thus has the photoactivatable layers 12 and 14, the metallic layers 11 and 13 and the carrier film 10. The mask 31 comprises a multiplicity of regions 33 in which the mask 31 is opaque or substantially opaque to the light 41 used for the exposure operation and a multiplicity of regions 34 in which the mask 31 is transparent or substantially transparent for the light 41 used for the exposure operation. The mask 32 likewise comprises a multiplicity of regions 36 in which the mask 32 is transparent or substantially transparent for the light 42 used for the exposure operation and a multiplicity of regions 35 in which the mask 32 is opaque or substantially opaque for the light used for the exposure operation. In that case the masks 31 and 32 are preferably two glass plates, preferably comprising quartz glass, which are provided with a correspondingly structured chromium mask, that is to say the chromium layer is present in the regions 33 and 35 respectively and it is not present in the regions 34 and 36 respectively.

In a first exposure procedure the film body 22 is now exposed with the light 41 through the mask 31 from the side of the metallic layer 11 so that in the regions 121 of the photoactivatable layers, that are beneath the regions 34 of the mask 31, the photoactivatable layer 12 is exposed and thus activated and in the regions 122 of the photoactivatable layers, that are beneath the regions 33 of the mask 31, it is not exposed and is thus not activated. In the same fashion in a second exposure procedure the film body 22 is exposed from the side of the metallic layer 13 with the light 42 so that in the region 142 of the photoactivatable layer 14, beneath the regions 35, the layer is not exposed and is thus not activated while in the region 141 of the photoactivatable layer 14, beneath the regions 36 of the mask 32, the photoactivatable layer 40 is exposed and thus activated.

The two exposure masks 31 and 32 are arranged in accurate register relationship with each other so that the two photoactivatable layers 12 and 14 are structured in mutually accurate register relationship by the two exposure processes.

By virtue of the screening action of the metal layers 13 and 11 it is possible in that case (with a suitable choice in respect of the illumination strength and the exposure time) to perform the first and second exposure steps simultaneously and at the same time. The exposure device shown in FIG. 3 has proven particularly advantageous for that purpose.

Figure 3:
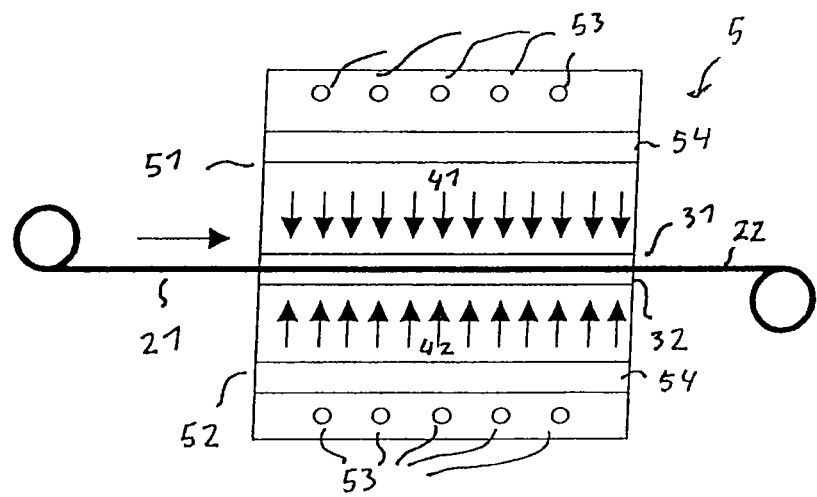
FIG. 3 shows a diagrammatic sectional view of an exposure device for an embodiment of the invention.

FIG. 3 shows an exposure device 5 to which on the one hand the film body 21 is fed from a film roll, which exposes the film body 21 and from which then the exposed film body 21, that is to say the film body 22, is removed and wound on to a further film reel or fed directly to a further production process, in particular an etching procedure.

The exposure device 5 has two exposure units 51 and 52 arranged at mutually opposite sides of the film body 21 and positioned in opposite relationship. The exposure unit 51 has an exposure mask 31, a plurality of light sources 53 and a collimator 54 which ensures that the light generated by the light sources 53 is incident on the exposure mask 31 with a parallel beam configuration. The exposure unit 52 has the exposure mask 32 and also a collimator 54 and a plurality of light sources 53. The exposure units 51 and 52 are preferably connected together by a holding frame and are fixed thereby at least when performing the exposure operation in register relationship with each other.

Exposure of the film body 21 by the exposure device 5 is effected in the stop-and-go mode of operation. The film body 21 is fed to the exposure device 5. The exposure units 51 and 52 are pressed against the film body 21 so that the masks 31 and 32 lie on the film body 21 and fix same. Exposure is then effected at both sides, the light strength and the exposure time being matched to the photoactivatable layers 12 and 14. In order further to avoid mutual influencing of the two exposure procedures which take place at the same time, it is also possible to use photoresists which respond to different wavelengths, for the photoactivatable layers 12 and 14.

After the exposure operation the exposed part of the film body 21, that is to say the film body 22, is moved out of the exposure device 5 and the procedure begins again from the outset.

It is also possible for the exposure units 51 and 52 not to be positioned in mutually opposite relationship but to be positioned in mutually juxtaposed relationship so that exposure of the front and rear sides of a region of the film body 21 is effected in time-displaced relationship. It is also possible to use drum exposure units for the exposure operation.

Figure 4:
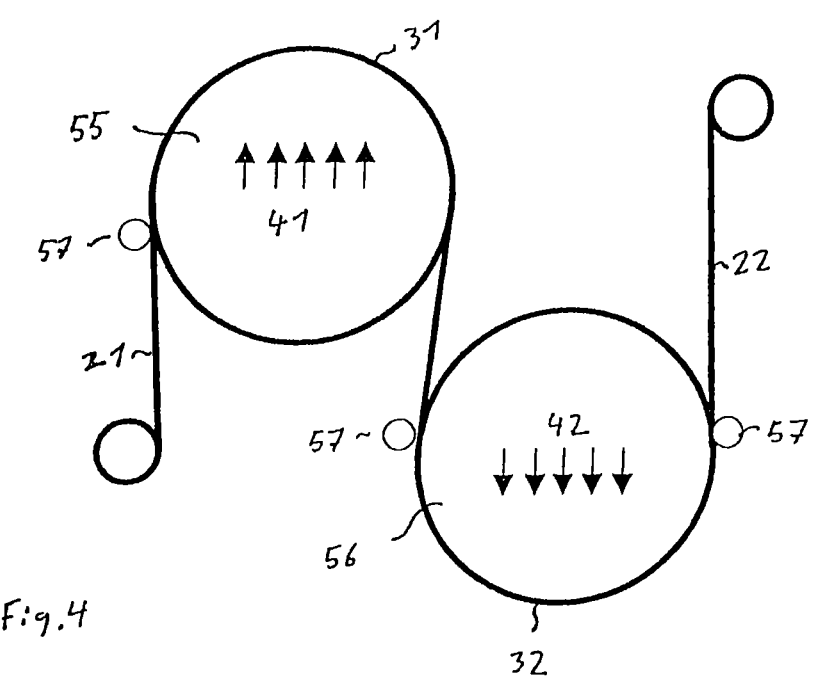
FIG. 4 shows a diagrammatic sectional view of an exposure device for a further embodiment of the invention.

FIG. 4 shows an exposure device comprising a first drum exposure unit 55 and a second drum exposure unit 56 in which the film body 21 is passed through the exposure device with the assistance of guide rollers 57. In that case the exposure masks 31 and 32 are arranged as endless masks on the peripheral surface of the respective drum exposure unit 55 and 56. Here exposure is effected by means of light sources which are arranged in the interior of the drum exposure units 55 and 56 and which generate the light 41 and 42 and expose the film body guided over the peripheral surfaces of the drum exposure units 55 and 56. In this case the drums of the drum exposure units 55 and 56 are synchronised with each other and are thus connected together for example by way of a transmission. That ensures that the first and second exposure procedures are synchronised with each other and the photoactivatable layers 12 and 14 are structured in accurate register relationship with each other.

After the exposure operation and thus structuring of the photoactivatable layers 12 and 14, in a subsequent development and etching procedure the regions of the metallic layers 11 and 13 are removed, in which the photoactivatable layer 12 or 14 respectively has been activated, that is to say destroyed (when using a positive resist) or not activated, that is to say not hardened (when using a negative resist). Thus the film body 22 is fed for example to an etching bath in which the metallic layer 11 and the metallic layer 13 which are arranged beneath the unexposed regions 122 of the photoactivatable layer 12 or beneath the unexposed regions 142 of the photoactivatable layer 14 are removed. After a washing and a drying process one or more further layers are then applied to the metallic layer 11 which is now structured and then a further metallic layer and a further photoactivatable layer are applied over the full surface area to the layer or layers.

Figure 5:
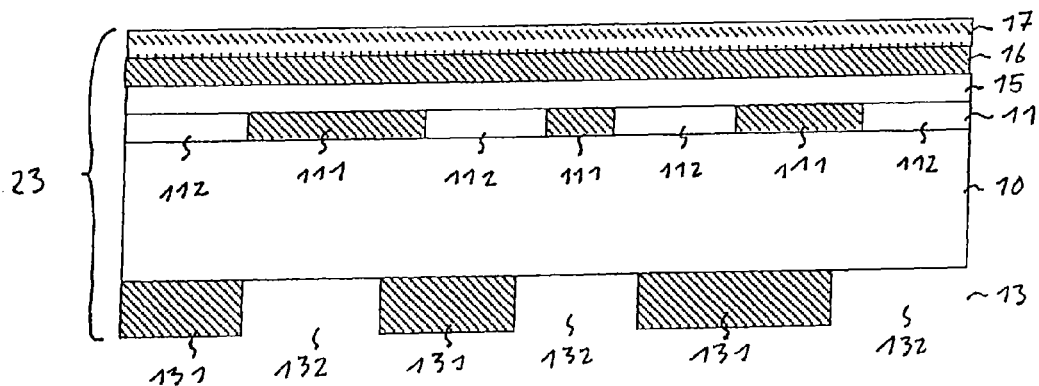
FIG. 5 shows a diagrammatic sectional view of a film body having a masking layer and a first metallic layer which are structured in accurate register relationship with each other.

FIG. 5 shows the resulting film body 23: the film body 23 has the carrier film 10, on one side of which is disposed the metallic layer 13 which is now structured and on the other side of which is disposed the structured metallic layer 11. The metallic layer 13 now comprises regions 131 in which there is metal and regions 132 in which the metal of the metallic layer 13 is not present. The metallic layer 11 now also comprises regions in which the metal of the metallic layer 11 is present and regions 112 in which the metal is not present. Applied to the metal layer 11 is a layer 15 which for example is a transparent lacquer layer of a thickness in the range of 50 nm to 1000 nm. It is however also possible for still further layers to be applied to the metallic layer 11 instead of the layer 15 or in addition to the layer 15. Such layers are for example replication lacquer layers in which diffractive structures are embossed, or also coloured layers.

In addition it is also possible that the layer 15 or the further layers involve electrical function layers. Thus it is possible for example that instead of the layer 15 a semiconductor layer of a thickness of 30 to 100 nm, preferably about 50 nm, and a layer comprising an insulator, for example of a thickness of 100 nm to 1000 nm, preferably 500 nm, is provided.

The layer 15 is followed by a further metallic layer 16 which preferably involves a thin copper layer of a thickness of 10 to 50 nm, preferably 30 nm. The metallic layer 16 can however also comprise another material, for example silver or aluminium, or a succession of a plurality of different metallic layers. The metallic layer 16 is followed by the photoactivatable layer 17 which in the FIG. 5 embodiment is a negative photoresist which is applied in a layer thickness of between 100 and 800 nm, preferably about 200 nm, and which is designed for an exposure wavelength of about 365 nm.

Figure 6:
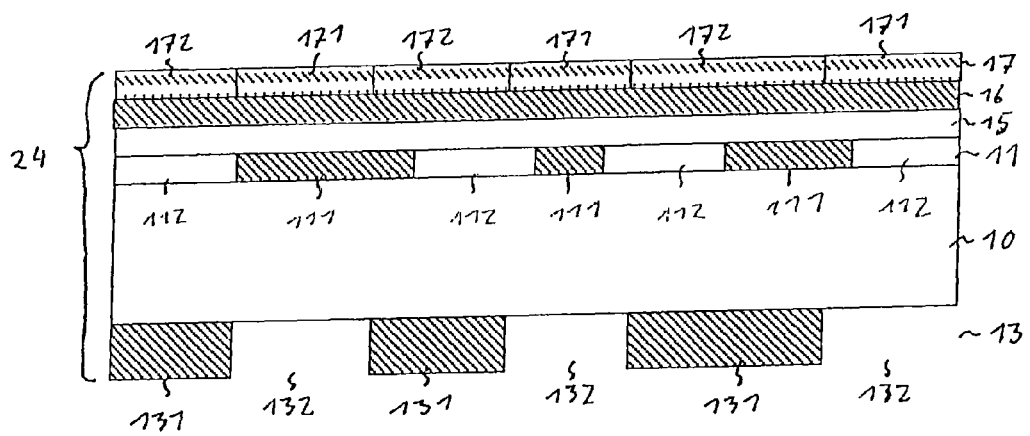
FIG. 6 shows a diagrammatic sectional view of a film body exposed by means of trans-exposure through a masking layer.
Figure 6:
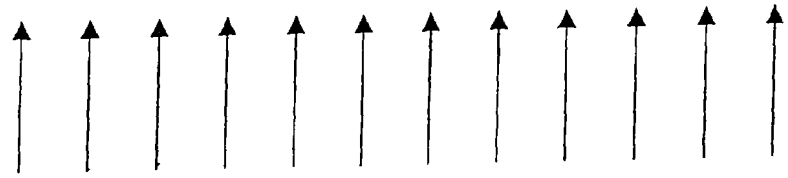
Figure 7:
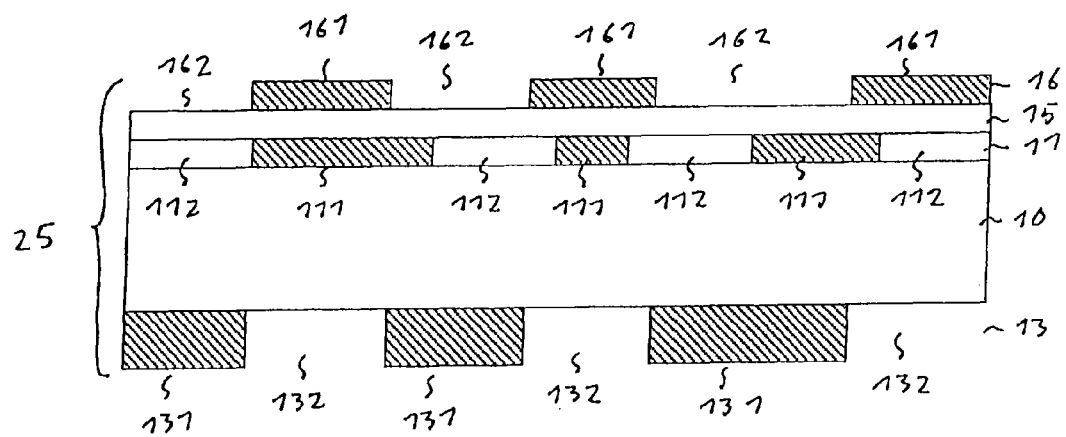
FIG. 7 shows a diagrammatic sectional view of the film body of FIG. 6 after carrying out an etching procedure.

Now in a next step the film body 23 is exposed from the side of the metallic layer 13, as shown in FIG. 6. As shown in FIG. 6 in that case the exposure device is arranged on the side of the film body 23, on which the masking layer, the metallic layer 13, is also arranged. Accordingly the metallic layer 13 forms that layer of the film body 23 representing the layer of the film body 23, that is closest to the exposure device. Exposure is thus effected through the metallic layer 13 and the layers disposed therebeneath of the film body.

FIG. 6 shows a film body 24 corresponding to the film body 23 after the exposure step. The film body 24 has the metallic layers 13, 11 and 16, the carrier film 10, the layer 15 and the photoactivatable layer 17. As shown in FIG. 6 the photoactivatable layer 17 is activated in regions 171 arranged in overlapping relationship with the regions 132 of the metallic layer 13 and is not activated in regions 172 which are arranged in overlapping relationship with the regions 131 of the metallic layer 13, and are thus structured. So that this result can be achieved however special conditions are to be observed: the ratio of the degrees of transmission of the metallic layer 13 and the metallic layer 11 (in the regions in which the respective metal layer is provided) at the wavelength range of the electromagnetic radiation used for the trans-exposure operation is in that case to be selected to be greater than or equal to 1:10. The material and the thickness of the metallic layers 11 and 13 are now so selected that that condition is met. In addition it has also proven to be advantageous to observe the following condition: the ratio of the degree of transmission of the metallic layer 11 to the degree of transmission of the metallic layer 13 at the wavelength of the electromagnetic radiation used for the trans-exposure step is preferably greater than or equal to 1:15, further preferably between 1:15 and 1:20. Investigation has shown that the transmission characteristics at approximately perpendicular irradiation of the layer body formed from the layers 13, 10, 11, 15 and 16 can be portion-wise determined approximately by multiplication of the degrees of transmission of the individual layers. Investigation has further shown that successful exposure of the photoactivatable layer 17 makes it necessary for the amount of light incident in the regions 171 and 172 to differ at least by the factor of 15. With a degree of transmission of the metallic layers 13 in the regions 131 of $T_{13}$ and a degree of transmission of the metallic layers 11 in the regions 111 of $T_{11}$ (with the assumption that the degree of transmission in the regions 132 and 112 is 100%), that thus gives the following standardised degree of transmission for the different portions of the film body 24:

Regions in which the metallic layer 13 is provided but the metallic layer 11 is not provided: $T_{13}$.

Regions in which the metallic layer 13 and the metallic layer 11 are provided: $T_{13} \times T_{11}$.

Regions in which neither the metallic layer 13 nor the metallic layer 11 are provided: 100%.

Regions in which the metallic layer 13 is not provided but the metallic layer 11 is provided: $T_{11}$.

In order thus to ensure successful exposure of the photoactivatable layer 17 even for the situation in which regions 111 and 132 overlap, the ratio $T_{11}$ to $T_{13}$ must be greater than or equal to 15. In addition the illumination strength and the illumination time are then so selected that the photoactivatable layer 17 is still activated in the regions in which the regions 132 and 111 overlap and is not yet activated in the regions in which the regions 131 and 112 overlap. That can be easily ascertained by suitable measurement series.

In a further step the film body 25 is then subjected to a developing and etching procedure insofar as in the regions 172 in which the photoactivatable layer 17 has not been activated the metallic layer 16 is removed and in the regions 171 in which the photoactivatable layer has been activated it remains protected by the photoresist and thus remains on the layer 15. After washing, stripping and drying that therefore gives the film element 25 shown in FIG. 7, which includes the structured metallic layers 13, 11 and 16, the carrier film 10 and the layer 15. In coincident relationship with the regions 131 the metallic layer 16 has regions 162 in which the metal of the metallic layer 16 is not provided and in coincident relationship with the regions 132, regions 161 in which the metal of the metallic layer 16 is provided. Thus the metallic layer 16 is structured in accordance with the metallic layer 13 and thus in accurate register relationship with the metallic layer 11. The regions 161 and 111 of the metallic layers 16 and 11 are thus oriented in accurate register relationship with each other, in spite of the large number of process steps which were implemented between structuring of the metallic layer 11 and the metallic layer 16.

Figure 8:
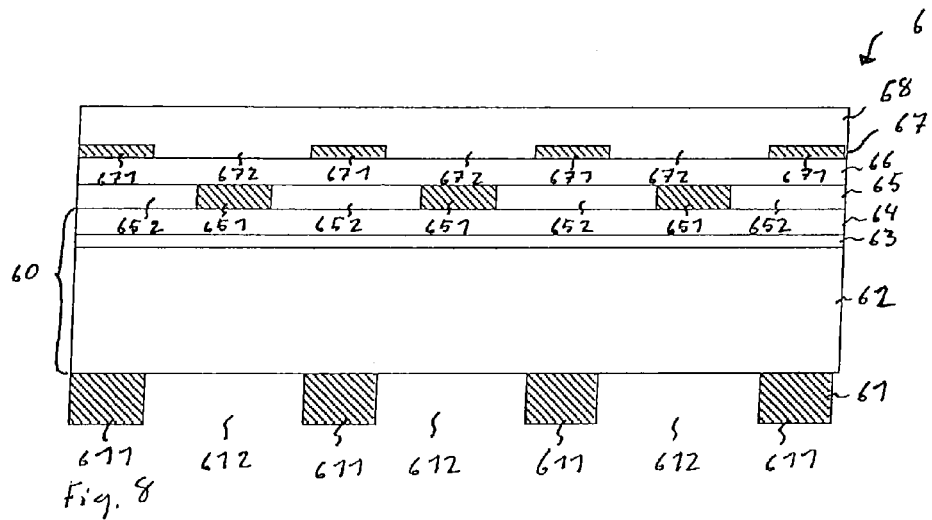
FIG. 8 shows a diagrammatic sectional view of a film body providing an optical security element.

FIG. 8 shows a film body 6 which can be used as an optical security element. The film body 6 has a carrier film 60 comprising a plastic film 62, a release layer 63 and a replication lacquer layer 64. The plastic film 62 is preferably a plastic carrier consisting of PET or BOPP and of a thickness of between 8 μm and 125 μm. The replication layer 64 is a replication lacquer in which a surface relief can be shaped by means of a heated embossing punch or by means of UV replication. The replication layer 64 thus involves for example a thermoplastic lacquer. The release layer 63 is a layer for example containing wax components which permits release of the layer 62 from the layer body following the layer 64. The film body 6 also has metallic layers 61 and 67, a further replication layer 66 and a protective lacquer layer 68.

As already described hereinbefore with reference to FIGS. 1 to 6 the film body 6 is produced by means of trans-exposure through the metallic layer 61 serving as the masking layer. Instead of the carrier film 10 the carrier film 60 is used in that case and in that respect produced in a production step preceding the exposure procedure described in FIG. 2:

In this case the release layer 63 and then the replication layer 64 are applied over the full surface area to the plastic film 62. An optically effective surface relief, for example a diffraction grating or a hologram, is then introduced into the replication layer 64, for example by means of heat and pressure, using a replication roller or by means of UV replication. Then in accordance with the embodiments of FIGS. 2 to 4 the metallic layers 61 and 65 are applied and structured in accurate register relationship with each other. The replication layer 66 is then applied and an optically effective surface relief, for example a diffraction grating or a hologram, is also shaped in that layer. Then, in accordance with the embodiments of FIGS. 5 and 6, the metallic layer 67 is applied to the replication lacquer layer 66 and structured by means of trans-exposure through the metallic layer 61. The protective lacquer layer 68 is then applied.

In this case the refractive index of the protective lacquer layer 68 and the two replication layers 64 and 66 is so selected that the refractive index of those layers is identical or differs only slightly from each other so that, in the regions in which a metallic layer is not applied to the surface structures, the optical effect of the surface structure is extinguished. In addition it is also possible to dispense with the use of the replication lacquer layers 54 and 68 and the shaping of optically effective surface reliefs in those layers (then for example a transparent lacquer layer is provided instead of the replication layer 66).

In this case the metallic layer 65 and the metallic layer 61 are structured in a process step as shown in FIG. 6 in such a way that, in relation to the metallic layers 67 and 65, the regular arrangement indicated in FIG. 8 relative to each other is afforded: in the first region 651 there is the metallic layer 65 and in the second region 652 the metallic layer 65 is not present. The regions 652 and 651 are arranged in accordance with a regular geometrically transformed line raster so that the regions 651 are equidistantly spaced from each other.

In the same manner the metal layer 67 comprises regions 671 in which the metallic layer is provided and regions 672 in which the metallic layer is not provided, the regions 671 and 672 also being oriented in accordance with a regular line raster. As indicated in FIG. 8 in this case the raster spacings of the two line rasters are the same and the width of the metallic regions 671 and 651 as well as the orientation of the rasters relative to each other are so selected that the regions 671 are arranged in the region of the regions 652 and the regions 651 are arranged in the region of the regions 672. In addition the width of the regions 651 and 671 and the orientation of the two rasters relative to each other are preferably so selected that—as shown in FIG. 8—there is a small gap between the respective regions 671 and 651 and thus the body formed by the layers 63 to 68 is transparent in that region. Preferably identical rasters are thus used for the layers 65 and 67, which are displaced relative to each other through about 180°, that is to say about one-half of a raster spacing, and the width of the metallic regions 651 and 671 is so selected that they are smaller than half the raster width, preferably being about one quarter of the raster width.

Figure 10:
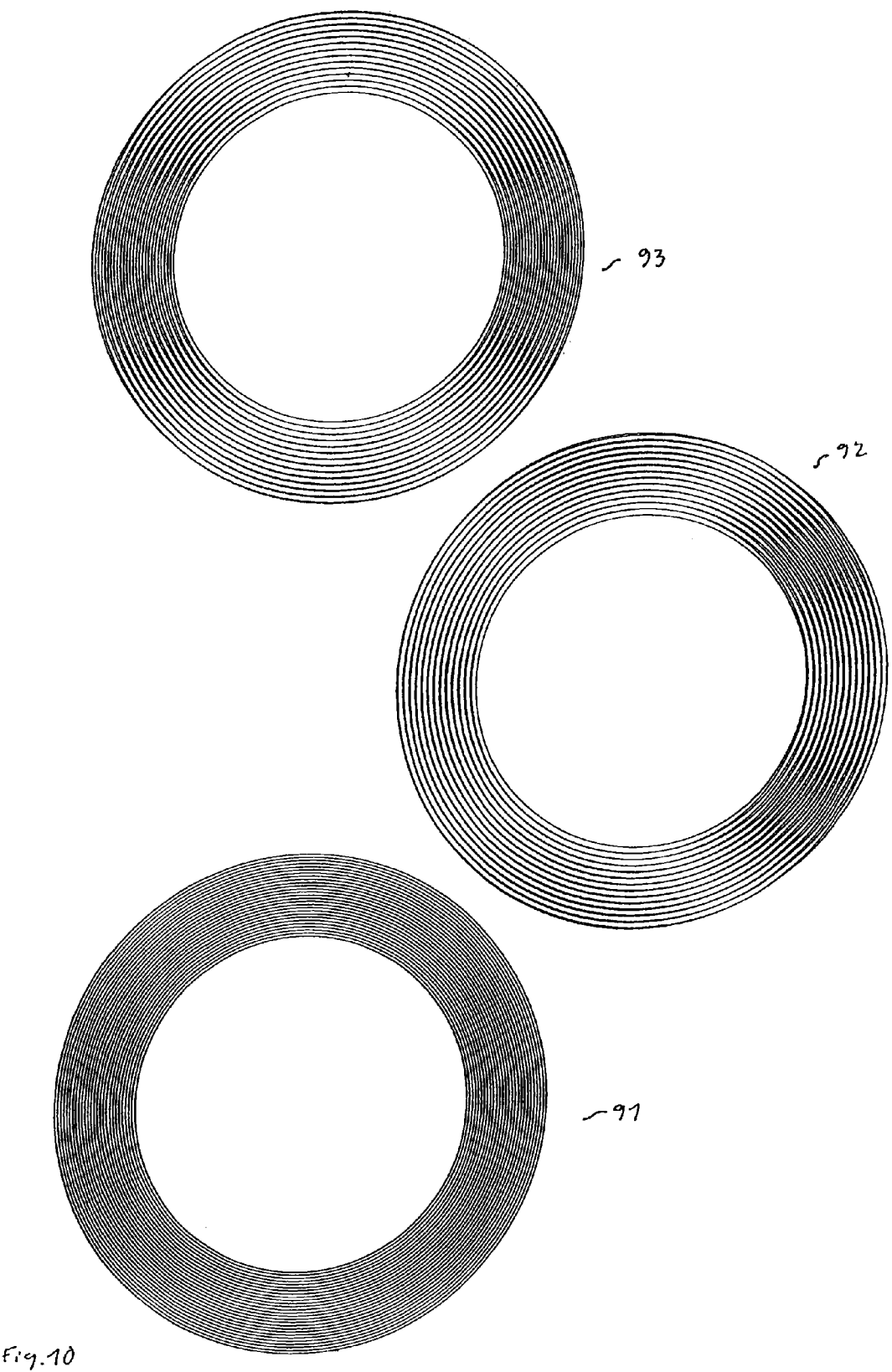
FIG. 10 shows a number of views illustrating the optical action of the metallic layers of the film body of FIG. 8.

If circularly transformed line rasters are used as the rasters for the metallic layers 65 and 67, an optical image 91 as is shown in FIG. 10 is produced with structuring of the layers being oriented in accurate register relationship with each other:

The optical image 91 is formed by a succession of concentric circles, a circle being formed alternately by a region 671 of the metal layer 67 and a region 651 of the metallic layer 65. If the two metallic layers 65 and 67 are structured in mutually accurate register relationship in the above-described manner, the viewer sees a regular succession of concentric circles. With just slight register inaccuracy in structuring of the layers 65 and 67 the optical image changes markedly for the viewer: thus FIG. 10 shows an optical image 92 and an optical image 93 in which on the one hand there is a slight horizontal displacement and on the other hand a slight distortion of the orientation of the structuring of the layers 65 and 67 relative to each other. Due to the moiré effect occurring here and the specific properties of the perception of optical representations by a human viewer, those very slight changes (already occurring with a few percent deviation) can be markedly seen by the human viewer.

Figure 11:
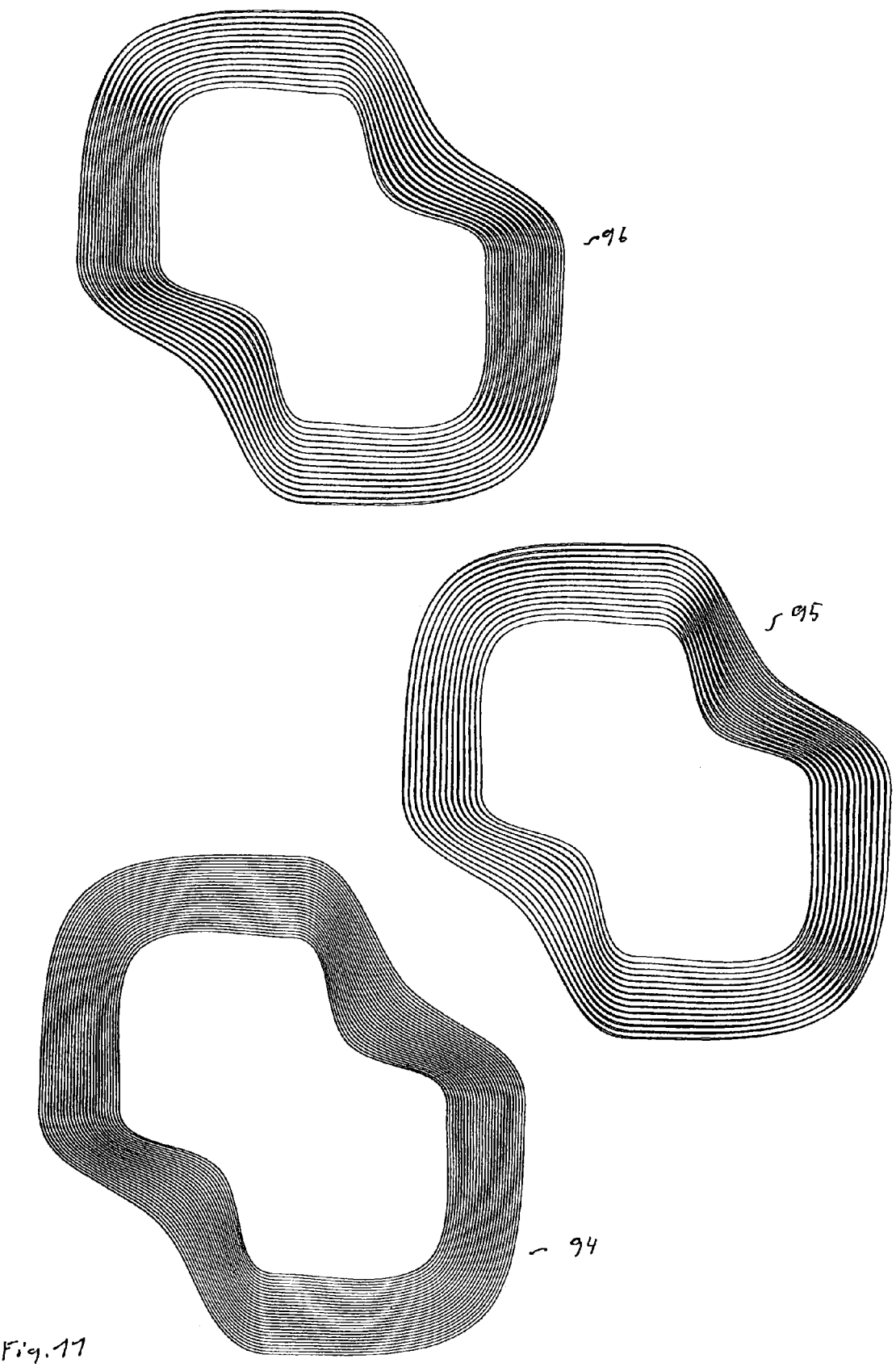
FIG. 11 shows a number of views illustrating the optical action of the metallic layers of the film body of FIG. 8.

FIG. 11 shows optical images 94, 95 and 96 of a further structuring of the metallic layers 67 and 65, wherein here, in contrast to the FIG. 10 embodiment, it is not a circularly geometrically transformed line raster but a line raster transformed in accordance with a geometrical figure, that forms the basis of the structuring of the metallic layers 65 and 67. The optical image 94 shows the image when the layers are oriented in accurate register relationship and the optical images 95 and 96 show the images upon slight vertical displacement or slight distortion of the structuring of the metallic layers 65 and 67 relative to each other.

The film body 6 in FIG. 8 can also be provided with one or more further layers, for example with an adhesive layer. In addition the release layer 63 permits release of the plastic film 62 with the metallic layer 61 from the rest of the film body so that the film body with the layers 64 to 68 can be transferred as a security element for example by hot embossing on to a document to be safeguarded. The invention is thus also directed to such a film body which serves as a security element and which has two metallic layers, namely the layers 65 and 67, between which there is at least one transparent further layer, namely the layer 66, wherein the two metallic layers are in accordance with the further features of claims 32 to 34.

Figure 9:
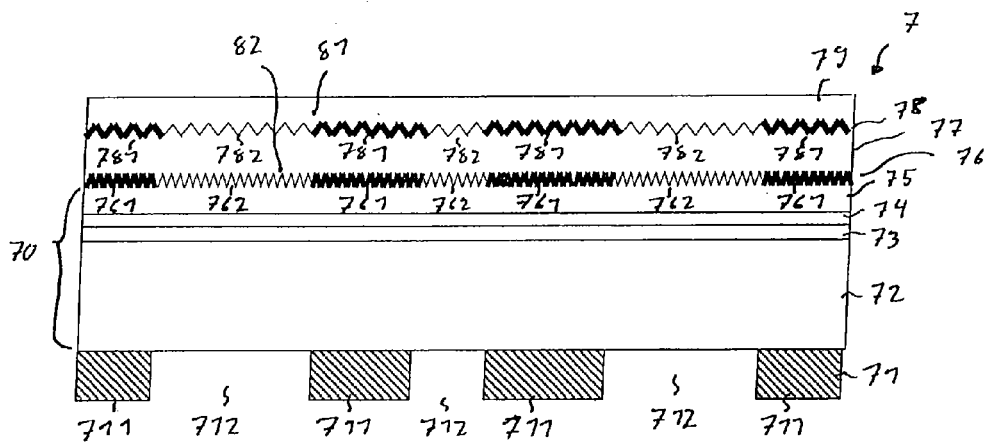
FIG. 9 shows a diagrammatic sectional view of a film body providing an optically variable security element.

FIG. 9 shows a film body 7 which can also be used as a security element, for example for safeguarding banknotes, value-bearing documents or ID documents. The film body 7 has a carrier film 70 having a replication layer 75, a protective lacquer layer 74, a release layer 73 and a plastic film 72, metallic layers 71, 76 and 78, a replication layer 77 and an adhesive layer 79. The film body 7 is produced as described in relation to the film body 6 in FIG. 8, in which case a first optical-diffraction relief structure 82 is shaped into the surface of the replication layer 75 and a second optical-diffraction relief structure 81 is shaped into the surface of the replication layer 77, as is also shown in FIG. 9. Here too the metallic layer 78 is structured by means of trans-exposure through the metallic layer 71 serving as a masking layer so that the metallic layer is provided in regions 781 and the metallic layer is not provided in regions 782, in coincident relationship with the metallic regions 711 of the metallic layer 71.

As shown in FIG. 9 the structuring of the metallic layers 76 and 78 differs however from the structuring of the metallic layers 65 and 67 shown in FIG. 8: the metallic layers 76 and 78 are provided in substantially mutually coincident relationship so that the regions 761 and 781 in which the metal of the respective metallic layer is provided and the regions 762 and 782 in which the metal of the respective metallic layer is not provided are disposed in substantially mutually coincident superposed relationship. Now different optical-diffraction structures, for example different holograms, are selected for the optical-diffraction relief structures 81 and 82. Thus a different optical impression is presented after removal of the body formed by the plastic film 72 and the metallic layer 71 from the remaining part of the film body by means of the release layer 73, when viewing from the front side and from the rear side: when viewing from the side of the layer 79, the optical effect generated by the optical-diffraction relief structure 81, for example a first hologram, is presented, superposed by the feature formed by the transparent region (regions 782 and 762). When viewing from the side of the layer 74 the optical impression generated by the optical-diffraction relief structure 82 is presented, for example a second hologram, and also the feature provided by the transparent regions 782 and 762.

The invention claimed is:

1. A film element comprising:
   a flexible single-layer or multi-layer carrier film;
   a first metallic layer provided on a first surface of the carrier film;
   a masking layer provided on a second surface of the carrier film opposite to the first surface;
   a second metallic layer arranged on the side of the first surface; and
   one or more further layers arranged between the first and second metallic layers,
   wherein the masking layer comprises a pattern of regions including regions in which material of the masking layer is present and regions in which material of the masking layer is not present, and
   wherein the second metallic layer comprises a pattern of regions including regions in which material of the second metallic layer is present and regions in which material of the second metallic layer is not present, and
   wherein the pattern of regions of the masking layer in which material of the masking layer is present is in coincident superposed relationship with the pattern of regions of the second metallic layer in which material of the second metallic layer is not present, and
   wherein the first and the second metallic layers at least region-wise overlap, and
   wherein the thickness and the material of the masking layer and the first metallic layer are so selected that a ratio of the degrees of light transmission of the masking layer and of the first metallic layer at a wavelength of an electromagnetic radiation which can be used for a trans-exposure operation is greater than 1:10.

2. A film element according to claim 1, wherein the first metallic layer comprises silver and is of a layer thickness of 20 to 40 nm.

3. A film element according to claim 1, wherein the second metallic layer comprises copper and is of a layer thickness of 10 to 50 nm.

4. A film element according to claim 1, wherein the second metallic layer comprises two or more mutually superposed sublayers of different metals.

5. A film element according to claim 1, wherein the masking layer comprises a metal or a metal alloy.

6. A film element according to claim 1, wherein the masking layer comprises two or more layers and in that respect includes one or more metal layers.

7. A film element according to claim 1, wherein the carrier film has a release layer which permits release of a film body including the first and second metallic layers from the film element.

8. A film element according to claim 1, wherein the carrier film has a release layer which permits release of a film body including the masking layer from the film element.

* * * * *